United States Patent Office 3,634,389
Patented Jan. 11, 1972

3,634,389
BASIC MONOAZO DYES
Roland Entschel, Basel, Curt Mueller, Binningen, Basel-Land, and Hans Siegrist, Therwil, Basel-Land, Switzerland, assignors to Sandoz Ltd., Basel, Switzerland
No Drawing. Filed Jan. 24, 1969, Ser. No. 793,576
Claims priority, application Switzerland, Feb. 13, 1968, 2,136/68; Aug. 2, 1968, 11,580/68
Int. Cl. C09b 29/08; D06p 1/02
U.S. Cl. 260—158                    10 Claims

ABSTRACT OF THE DISCLOSURE

Basic azo dyes of the formula

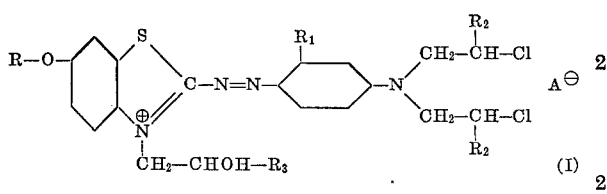

where R stands for an alkyl radical, $R_1$ for hydrogen or an alkyl radical, $R_2$ for hydrogen or an alkyl radical, $R_3$ for hydrogen, an alkenyl radical, an unsubstituted alkyl radical or an alkyl radical substituted by aryl or alkoxy and $A^\ominus$ for an anion.

---

This invention relates to basic azo dyes of the formula

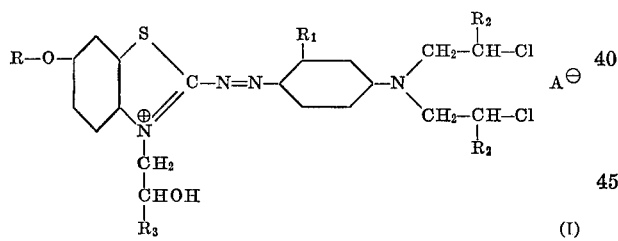

where

R stands for an alkyl radical which may be substituted,
$R_1$ for hydrogen or an alkyl radical which may be substituted,
$R_2$ in each instance for hydrogen or an alkyl radical which may be substituted,
$R_3$ for hydrogen, an alkenyl radical which may be substituted, an unsubstituted alkyl radical, or an alkyl radical substituted by aryl or alkoxy, and
$A^\ominus$ for an anion equivalent to the dye cation.

Particularly good dyes of Formula I are those in which R represents a lower alkyl radical and $R_1$ and $R_2$ both represent hydrogen or methyl, in particular dyes of the formula

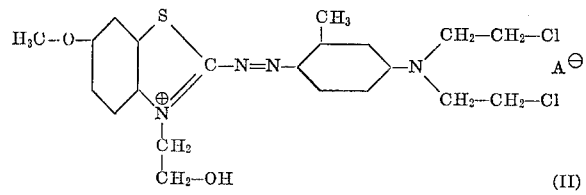

The dyes of Formula I can be produced by reacting, i.e. quaternating, a compound of the formula

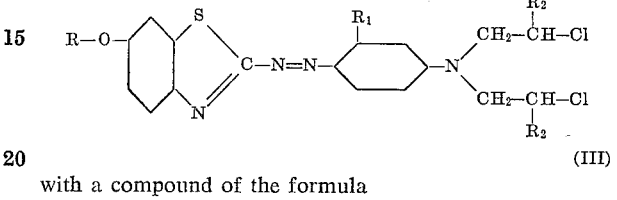

with a compound of the formula

In the dyes of Formula I the anion $A^\ominus$ may be exchanged for other anions, e.g. by means of an ion exchanger or by reaction with salts or acids, and if necessary in more than one stage, e.g. via the hydroxide. It is of advantage to employ ethylene oxide or propylene oxide as compound of Formula IV.

Another suitable mode of production for the dyes of Formula I is the oxidative coupling of the hydrazones of compounds or the functional derivative of compounds, whose radicals are of the formula

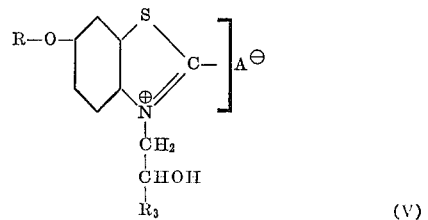

with amines of the formula

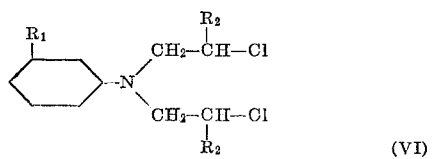

It is desirable for the dyes of Formula I to be free from water solubilizing substituents, in particular from sulphonic acid groups. The alkyl radicals R, $R_1$ and $R_2$ generally contain 1 to 12 or preferably, 1 to 4 or 1 to 3 carbon atoms; they may thus be lower alkyl radicals. If these radicals are substituted they contain in particular halogen atoms, hydroxyl or cyano groups, or aryl radicals, for example phenyl radicals; in such cases alkyl stands for an arylalkyl radical, e.g. benzyl radical. In each instance halogen refers preferably to chlorine or bromine.

The alkyl or alkenyl radical $R_3$ may bear 1 to 12 or preferably 1 to 6 carbon atoms. It may be straight or branched and may be substituted by alkoxy or by aryl, e.g. phenyl, in which case the alkoxy radical contains 1 to 12 or preferably 1 to 4 carbon atoms.

The anion $A^{\ominus}$ may be an organic or inorganic ion, e.g. the ion of a halogen, such as chlorine, bromine or iodine, the hydroxide, carbonate, bicarbonate, methylsulphate, sulphate, disulphate, perchlorate, phosphate, phosphorus molybdate, phosphotungstic molybdate, benzenesulphonate, naphthalenesulphonate, 4-chlorbenzenesulphonate, oxalate, acetate, maleinate, propionate, methanesulphonate, chloracetate or benzoate ion or a complex anion, such as that of zinc chloride double salts.

The reaction of a compound of Formula III with a compound of Formula IV is generally effected in acid medium, the acid being advantageously an organic one, such as formic, acetic, propionic or benzoic acid. But the reaction can be conducted in the presence of inorganic acids such as sulphuric, perchloric, phosphoric or hydrohalic acids. These acids may be employed in concentrated form, in dilute aqueous solution or in mixture with organic solvents, with the addition of water if necessary. Organic acids in concentrated form are generally employed, if this type of acid is selected for the reaction, but they may be used in mixture with water or organic solvents if preferred. Examples of suitable organic solvents include organic hydrocarbons, such as benzene, toluene and xylene; halogenated aliphatic and aromatic hydrocarbons, such as chloroform, ethylene chloride, chlorobenzene and dichlorobenzene, alcohols, such as ethanol, ethylene glycol and benzyl alcohol, ketones, such as acetone and cyclohexanone, esters, such as acetic acid ethyl ester; ethers, such as diethyl ether and dioxan, and nitro compounds, such as nitromethane and nitrobenzene. Alternatively, the reaction can be performed in the presence of para-toluenesulphonic acid, boron trifluoride or tin (IV) chloride.

The reaction is effected to advantage within the temperature range of —20° to +200° C., preferably at +30° to +70° C. For initiating the reaction, the compound of Formula III is preferably dissolved completely or partially, in the acidified reaction mixture, and an equivalent amount or an excess of a compound of Formula IV is added either gradually or in one lot, as preferred.

The dyes thus obtained are used for dyeing and printing polyacrylonitrile and acrylonitrile copolymer fibres and textiles which consist wholly of these fibres or contain an acrylic component.

Further, the dyes are suitable for dyeing and printing polyamide fibres and polyester fibres modified by the introduction of acid groups. Polyamide fibres of this type are known, for example, from Belgian Pat. 706,104, whilst the analogous polyester fibres are disclosed in U.S. Pat. 3,379,723. The dyes are employable further for the coloration of plastics, leather and paper.

The dyes are best applied from an aqueous neutral or acid medium at from 60° C. to the boil, or at temperatures above 100° C. under static pressure. Level dyeings are obtained having good fastness to light, sublimation pressing and wet treatments, e.g. water, perspiration, washing, sea water, bleaching, cross dyeing, decatizing, dry cleaning and solvents. The dyes are well soluble in water, have good pH stability and good power of build-up.

Those dyes of the invention which are highly soluble in organic solvents are suitable for the pigmentation of natural and synthetic resins and plastics. A number of the new dyes are suitable, for example, for dyeing tannin-treated cotton, wool, silk, regenerated cellulosic fibres and polyamide fibres. It has been found that it is of advantage to employ mixtures of two or more of the new dyes or mixtures of these and other cationic dyes.

From Dutch patent application 6608698 dyes are known which are of the formula

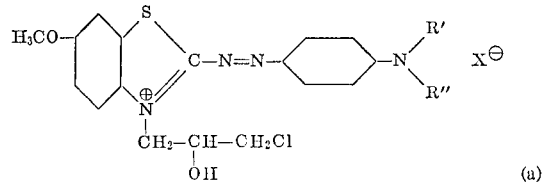

(a)

where R' and R'' may both represent chloroalkyl and $X^{\ominus}$ stands for an anion. The dyes of Formula a can be obtained by reacting, i.e. quaternating, a compound of the formula

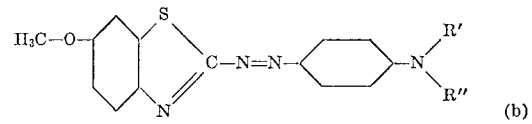

(b)

with epichlorohydrin. The dyes of Formula I show better stability to prolonged boiling than these dyes.

In the following examples the parts and percentages are by weight and the temperatures in degrees centigrade.

EXAMPLE 1

42.4 parts of a compound of the formula

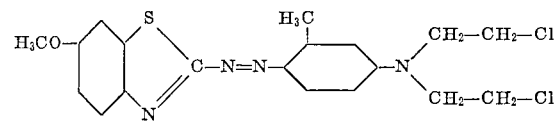

are dissolved in 400 parts of glacial acetic acid with stirring and the solution is raised to 40–45°. In the course of 2 hours 53 parts of ethylene oxide are conducted into the solution with constant stirring, after which time stirring is continued for a further 3 hours at 50–60°. The reaction solution is then run into 4000 parts of water, on which the dye formed is precipitated with common salt and isolated. This dye is of the formula

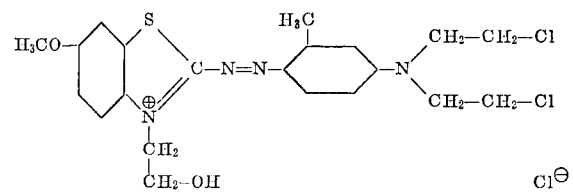

and dissolves in water to give blue solutions. It gives blue dyeings of very good fastness on polyacrylonitrile fibres.

The azo compounds listed below, which are specified by the diazo and coupling components used for their formation, can be reacted in the same manner to form dyes of Formula I.

TABLE

| Example No. | Diazo component | Coupling component | Quaternating agent | Shade of dyeing on polyacrylonitrile fibre |
|---|---|---|---|---|
| 2 | 2-amino-6-methoxybenzothiazole | N,N-bis-(2-chloroethyl)-aniline | Ethyleneoxide | Blue. |
| 3 | do | N,N-bis-(2-chloropropyl)-aniline | do | Do. |
| 4 | do | N,N-bis-(2-chloropropyl)-metatoluidine | do | Do. |
| 5 | 2-amino-6-ethoxybenzothiazole | N,N-bis-(2-chloroethyl)-aniline | do | Do. |
| 6 | do | N,N-bis-(2-chloroethyl)-metatoluidine | do | Do. |
| 7 | do | N,N-bis-(2-chloropropyl)-aniline | do | Do. |
| 8 | do | N,N-bis-(2-chloropropyl)-metatoluidine | do | Do. |
| 9 | 2-amino-6-methoxybenzothiazole | N,N-bis-(2-chloroethyl)-aniline | Propyleneoxide | Do. |
| 10 | do | N,N-bis-(2-chloroethyl)-metatoluidine | do | Do. |
| 11 | do | N,N-bis-(2-chloropropyl)-aniline | do | Do. |
| 12 | do | N,N-bis-(2-chloropropyl)-metatoluidine | do | Do. |
| 13 | 2-amino-6-ethoxybenzothiazole | N,N-bis-(2-chloroethyl)-aniline | do | Do. |
| 14 | do | N,N-bis-(2-chloroethyl)-metatoluidine | do | Do. |
| 15 | do | N,N-bis-(2-chloropropyl)-aniline | do | Do. |
| 16 | do | N,N-bis-(2-chloropropyl)-metatoluidine | do | Do. |
| 17 | 2-amino-6-methoxybenzothiazole | N,N-bis-(2-chloroethyl)-aniline | Butyleneoxide | Do. |
| 18 | do | N,N-bis-(2-chloroethyl)-metatoluidine | do | Do. |
| 19 | 2-amino-6-ethoxybenzothiazole | N,N-bis-(2-chloroethyl)-aniline | do | Do. |
| 20 | do | N,N-bis-(2-chloroethyl)-metatoluidine | do | Do. |
| 21 | 2-amino-6-methoxybenzothiazole | N,N-bis-(2-chloroethyl)-aniline | Methyl-glycidyl-ether | Do. |
| 22 | do | N,N-bis-(2-chloroethyl)-m-toluidine | do | Do. |
| 23 | 2-amino-6-ethoxybenzothiazole | N,N-bis-(2-chloroethyl)-aniline | do | Do. |
| 24 | do | N,N-bis-(2-chloroethyl)-metatoluidine | do | Do. |
| 25 | 2-amino-6-methoxybenzothiazole | N,N-bis-(2-chloropropyl)-aniline | do | Do. |
| 26 | do | N,N-bis-(2-chloroethyl)-aniline | Ethyl-glycidyl-ether | Do. |
| 27 | do | N,N-bis-(2-chloroethyl)-metatoluidine | do | Do. |
| 28 | 2-amino-6-ethoxybenzothiazole | N,N-bis-(2-chloroethyl)-aniline | do | Do. |
| 29 | do | N,N-bis-(2-chloroethyl)-metatoluidine | do | Do. |
| 30 | 2-amino-6-methoxybenzothiazole | N,N-bis-(2-chloroethyl)-aniline | Butyl-glycidyl-ether | Do. |
| 31 | do | N,N-bis-(2-chloroethyl)-metatoluidine | do | Do. |
| 32 | 2-amino-6-ethoxybenzothiazole | N,N-bis-(2-chloroethyl)-aniline | do | Do. |
| 33 | do | N,N-bis-(2-chloroethyl)-metatoluidine | do | Do. |
| 34 | 2-amino-6-methoxybenzothiazole | N,N-bis-(2-chloroethyl)-aniline | Allyl-glycidyl-ether | Do. |
| 35 | do | N,N-bis-(2-chloroethyl)-metatoluidine | do | Do. |
| 36 | 2-amino-6-ethoxybenzothiazole | N,N-bis-(2-chloroethyl)-aniline | do | Do. |
| 37 | do | N,N-bis-(2-chloroethyl)-metatoluidine | do | Do. |
| 38 | do | N,N-bis-(2-chloropropyl)-aniline | do | Do. |

DYEING EXAMPLE

A mixture of 20 parts of the dye of Example 1 and 80 parts of dextrin is ground in a ball mill for 48 hours. One part of the resulting preparation is pasted with 1 part of 40% acetic acid. The paste is mixed with 400 parts of demineralized water and boiled for a short time, the resultant being added to 7000 parts of demineralized water, with the subsequent addition of 2 parts of glacial acetic acid. 100 parts of a fabric of polyacrylonitrile fibre are entered into the dyebath at 0°, after previous treatment for 10-15 minutes at 60° in a bath of 8000 parts of water and 2 parts of glacial acetic acid. The dyebath is raised to 98-100° in 30 minutes and held at this temperature for 1½ hours. A blue dyeing with good light and wet fastness is obtained.

Formulae of representative dyes of the foregoing examples are as follows:

Example 1

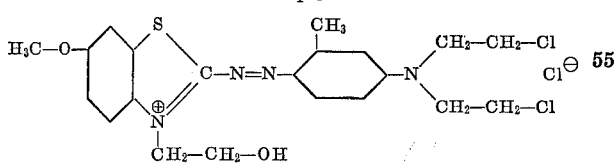

Example 2

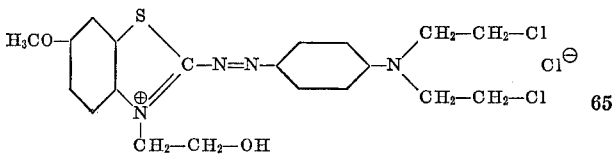

Example 5

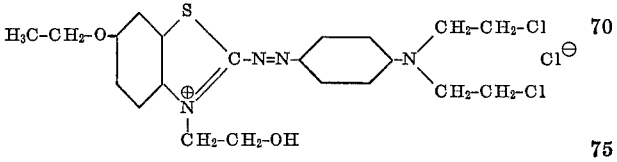

Example 6

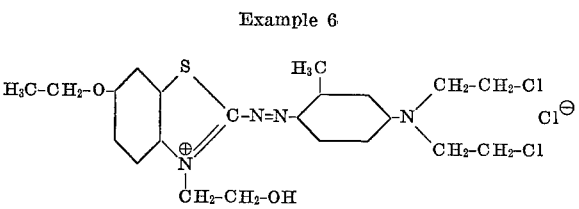

Example 10

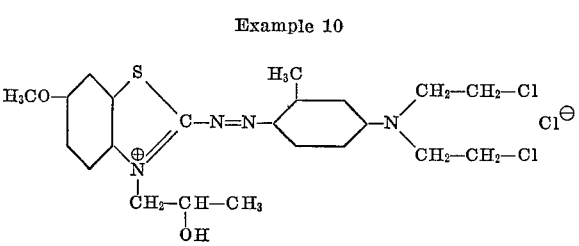

Having thus disclosed the invention what we claim is:
1. Basic azo dye of the formula

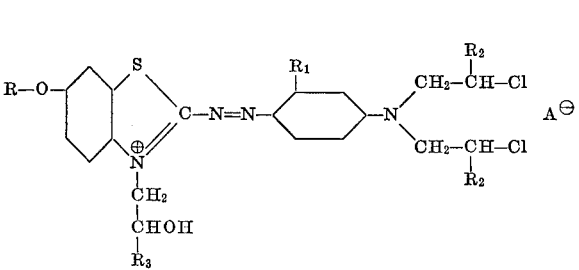

wherein

R is substituted or unsubstituted lower alkyl; any substituent of substituted lower alkyl being a member selected from the group consisting of halo, hydroxy, cyano and phenyl;

R₁ is substituted or unsubstituted lower alkyl or hydrogen; any substituent of substituted lower alkyl being a member selected from the group consisting of halo, hydroxy, cyano and phenyl;

each R₂ is, independently, substituted or unsubstituted lower alkyl or hydrogen; any substituent of substituted lower alkyl being a member selected from the group consisting of halo, hydroxy, cyano and phenyl;

R₃ is a member selected from the group consisting of hydrogen, substituted or unsubstituted alkenyl and substituted or unsubstituted alkyl; each alkyl and each alkenyl having from 1 to 6 carbon atoms; any substituent of substituted alkenyl or substituted alkyl being phenyl or alkoxy having from 1 to 4 carbon atoms; and A⊖ is an anion equivalent to the dye cation.

2. Basic azo dye according to claim 1 wherein R is lower alkyl or lower alkyl substituted by a member selected from the group consisting of chloro, bromo, hydroxy, cyano and phenyl; R₁ is hydrogen, lower alkyl or lower alkyl substituted by a member selected from the group consisting of chloro, bromo, hydroxy, cyano and phenyl; each R₂ is, independently, hydrogen, lower alkyl or lower alkyl substituted by a member selected from the group consisting of chloro, bromo, hydroxy, cyano and phenyl; and R₃ is (a) hydrogen; (b) alkenyl; (c) alkenyl substituted by phenyl or alkoxy having from 1 to 4 carbon atoms; (d) alkyl; or (e) alkyl substituted by phenyl or alkoxy having from 1 to 4 carbon atoms; each alkyl and each alkenyl of R₃ having from 1 to 6 carbon atoms.

3. Basic dye according to claim 1 wherein R is lower alkyl; R₁ is hydrogen or methyl; and R₂ is hydrogen or methyl.

4. Basic dye according to claim 1 wherein A⊖ is an anion selected from the group consisting of halide, hydroxide, carbonate, bicarbonate, methylsulfate, sulfate, disulfate, perchlorate, phosphate, phosphorus molybdate, phosphotungstic molybdate, benzenesulfonate, naphthalenesulfonate, 4-chlorobenzenesulfonate, oxalate, acetate, maleinate, propionate, methanesulfonate, chloracetate, benzoate and zinc chloride double salt.

5. A basic azo dye according to claim 1 and of the formula

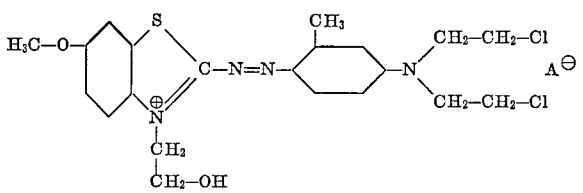

6. The basic azo dye according to claim 1 of the formula

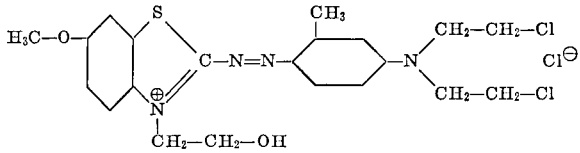

7. The basic azo dye according to claim 1 of the formula

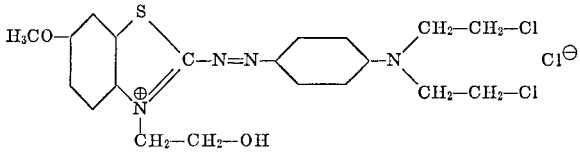

8. The basic azo dye according to claim 1 of the formula

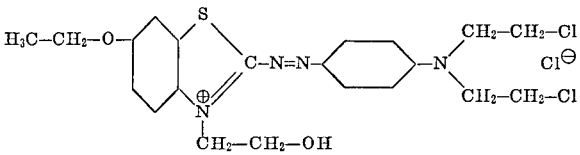

9. The basic azo dye according to claim 1 of the formula

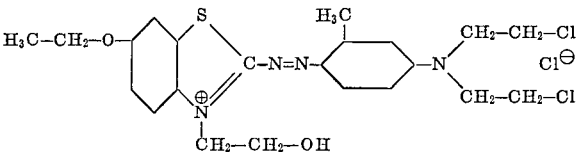

10. The basic azo dye according to claim 1 of the formula

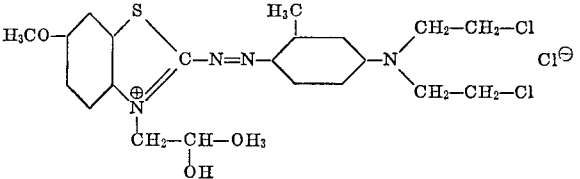

References Cited
FOREIGN PATENTS
6608698 12/1967 Netherlands _____ 260—158

JOSEPH REBOLD, Primary Examiner
D. M. PAPUGA, Assistant Examiner

U.S. Cl. X.R.
260—37 R, 146 R; 8—26, 177

UNITED STATES PATENT OFFICE
CERTIFICATE OF CORRECTION

Patent No. 3,634,389  Dated January 11, 1972

Inventor(s) ROLAND ENTSCHEL, CURT MUELLER, and HANS SIEGRIST

It is certified that error appears in the above-identified patent and that said Letters Patent are hereby corrected as shown below:

Column 1, line 24, (after the formula) "(I)" should read --(I),--; line 47, (after the formula) "(I)" should read --(I),--; line 61, "I" should read --(I)--. Column 2, line 8, (after the formula) "(II)" should read --(II).--; line 10, "I" should read --(I)--; line 25, (after the formula) "(IV)" should read --(IV).--; line 28, "I" should read --(I)--; line 33, "IV." should read --(IV).--; line 35, "I" should read --(I)--; line 48, (after the formula) "(V)" should read --(V),--; line 58, (after the formula) "(VI)" should read --(VI).--; line 61, "I" should read --(I)--; line 64, "12 or" should read --12 or,--. Column 3, line 21, "III" should read --(III)--; line 22, "IV" should read --(IV)--; line 37, after "dichlorobenzene" insert a semicolon --;--; line 38, after "alcohol" insert a semicolon --;--; line 39, after "hexanone" insert a semicolon --;--; line 40, after "dioxan" insert a semicolon --;--; line 47, "III" should read --(III)--; line 48, "tially, in" should read --tially in--; line 49, "IV" should read --(IV)--. Column 4, line 17, "chloroalkyl" should read --chloralkyl--; line 18, "Formula a" should read --Formula (a)--; line 31, "I" should read --(I)--; line 75, "I" should read --(I)--. Claim 10, line 3, (in the formula) "$CH_2\text{-}CH\text{-}OH_3$" should $$\phantom{CH_2\text{-}CH\text{-}OH_3}\ \ \ |$$
$$\phantom{CH_2\text{-}CH\text{-}}OH$$

read --$CH_2\text{-}CH\text{-}CH_3$--.

$$\phantom{CH_2\text{-}}|$$
$$\phantom{CH_2\text{-}}OH$$

Signed and sealed this 20th day of February 1973.

(SEAL)
Attest:

EDWARD M.FLETCHER,JR.
Attesting Officer

ROBERT GOTTSCHALK
Commissioner of Patents